United States Patent [19]

Monsen

[11] Patent Number: 4,993,182
[45] Date of Patent: Feb. 19, 1991

[54] ICE FISHING DEVICES

[76] Inventor: Arthur M. Monsen, Box 800, Palermo, Me. 04354

[21] Appl. No.: 397,267

[22] Filed: Aug. 23, 1989

[51] Int. Cl.$^5$ ............................................. A01K 97/12
[52] U.S. Cl. ....................................................... 43/17
[58] Field of Search ........................................... 43/17

[56] References Cited

U.S. PATENT DOCUMENTS

| | | | |
|---|---|---|---|
| 2,195,356 | 3/1940 | Biddinger | 43/17 |
| 2,575,156 | 11/1951 | Baugh | 43/17 |
| 2,786,294 | 3/1957 | Whitacre | 43/17 |
| 2,811,802 | 11/1957 | Schmidt | 43/17 |
| 2,934,849 | 5/1960 | Kampa | 43/17 |
| 2,970,400 | 2/1961 | Nolin | 43/17 |
| 3,134,188 | 5/1964 | Petersen | 43/17 |
| 3,230,655 | 1/1966 | Nomsen | 43/17 |
| 3,578,748 | 5/1971 | Hurd | 43/17 |
| 3,745,689 | 7/1973 | Williams | 43/17 |
| 3,813,891 | 6/1974 | Wooten | 62/56 |
| 4,747,226 | 5/1988 | Todd | 43/4 |
| 4,780,979 | 11/1988 | Dyck et al. | 43/17 |

OTHER PUBLICATIONS

Copies of 1988 Catalogue Sheets of Outdoor Concepts, Inc. of Huron, South Dakota Showing Transparent Hole Covers and (see SA-V) A Combined Tip-Up and Hole Cover.

Primary Examiner—Kurt Rowan

[57] ABSTRACT

Ice fishing devices in accordance with the invention have posts to each of which a line carrying reel is rotatably mounted and which has one end of a spring steel length attached thereto with a signal flag, a latch at the free end thereof. The side wall of the reel adjacent the post has a latch by which the catch is held when the device is set for use. The catch and latch are disengaged by a pull on the line in an unwinding direction adequate to turn the reel approximately a quarter turn. The posts are held by supports dimensioned to be seated on the margins of the holes. In the disclosed embodiments, the supports are insulated hole covers, each provided with a hole through which the line with its hook freely passes.

8 Claims, 5 Drawing Sheets

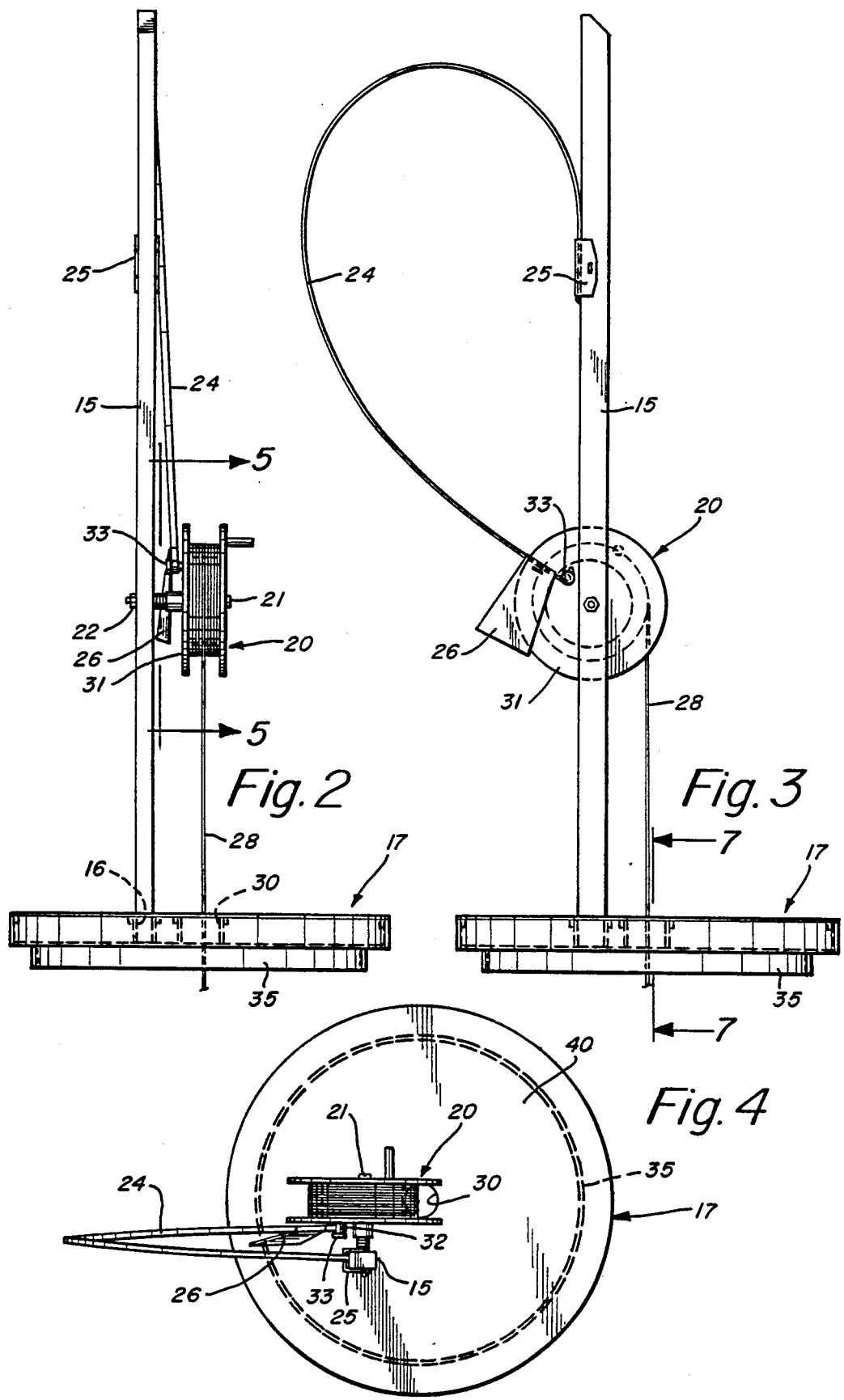

ICE FISHING DEVICES

BACKGROUND OF THE INVENTION

Ice fishing is a popular winter pastime and devices for use in such fishing have been much improved in recent times.

A typical device employs a support having a post to which a line carrying reel is rotatably connected with the support enabling the device to be positioned at or over a hole through the ice with the baited hook at a selected depth. A length of a straight, narrow spring has one end connected to the post and a signal flag attached to its other end. When the device is ready for use with enough line pulled from the reel to place the baited hook at a selected depth, the spring is manually curved to an extent enabling it to be releasably connected in one way or another to the reel or the line in order to free the spring when a fish takes the bait with the flag then elevated to signal that event.

Difficulties experienced with devices of the above described type are that the lines often become caught as holes freeze over and that the flag carrying spring often becomes accidentally released giving a false signal to the angler. Wind is a common but not the only cause of such false signals.

In earlier devices, the reels were located to be above water, but as the lines extending downwardly through the holes frequently became locked in ice, if the temperature was low enough, later devices, when set up for use, had their reels positioned to be below the surface of the water. Each such later device had its flag carrying spring releasably held by a trip extending downwardly through a tube and exposed to be releasably connected to the reel by a trip mechanism. While the lines of such devices did not become frozen in the hole in very cold weather, the water in the tubes freezes rendering the trip mechanisms inoperable. In addition, it remained necessary to keep each hole open in the event of a hooked fish or to enable the condition of the bait to be checked. In addition, the signal flags often were accidentally released as the trip mechanisms were not positively held.

THE PRESENT INVENTION

The general objective of the present invention is to provide ice fishing devices which better meet ice fishing requirements than do those currently in use.

One aspect of the invention is the manner in which the free end of the conventional narrow, straight spring, carrying the signal flag, is caught and held until the reel is turned in a line unwinding direction.

An ice fishing device incorporating this feature of the invention has a post provided with a support by which it can be held in a position of use at a hole through the ice. The line carrying reel is rotatably connected to the post with the side wall of the reel proximate to the post spaced therefrom to provide a gap into which a reel latch extends to be caught and held by a catch with which the free end of the spring is provided.

When the device is to be used, a length of line is withdrawn from the reel adequate to place the baited hook at a selected depth when entered through the hole in the ice. The spring is then manually curved in the appropriate direction and to the appropriate extent to enable its catch to engage and hold the latch until the reel has been turned in a line unwinding direction to a predetermined extent.

In one embodiment of the invention, the latch is a cylindrical stud fixed on the reel wall that is or is to be proximate to the post and spaced from the reel axis. In another embodiment, the latch is a tear or pear shaped cam with the wider end thereof arcuate with respect to the axis of rotation of the reel. In any case, the catch and latch are shaped and dimensioned for mutual engagement at points, spaced apart arcuately with respect to the reel from about 60° as a minimum with the maximum less than 180°.

Another aspect of the invention is the support of the posts of ice fishing devices. In accordance with the invention, each support is a hole cover in the form of a thermally insulated container having a central passageway through which the hook and line may freely be passed and an offset socket in its upper surface shaped and dimensioned to receive and hold the appropriate end of the post. The under surface of the container is provided with a depending wall dimensioned to fit within the hole in the ice then to hold the support from sliding out of position. Such a support is light in weight and, due to its insulation, maintains a hole in the ice free for long periods even in severe weather.

BRIEF DESCRIPTION OF THE DRAWINGS

The accompanying drawings illustrate preferred embodiments of ice fishing devices in accordance with the invention of which

FIG. 2 is an edge view of the device;

FIG. 3 is a side view of the device;

FIG. 4 is a view of the device as seen from above;

THE PREFERRED EMBODIMENT OF THE INVENTION

Figure 1:
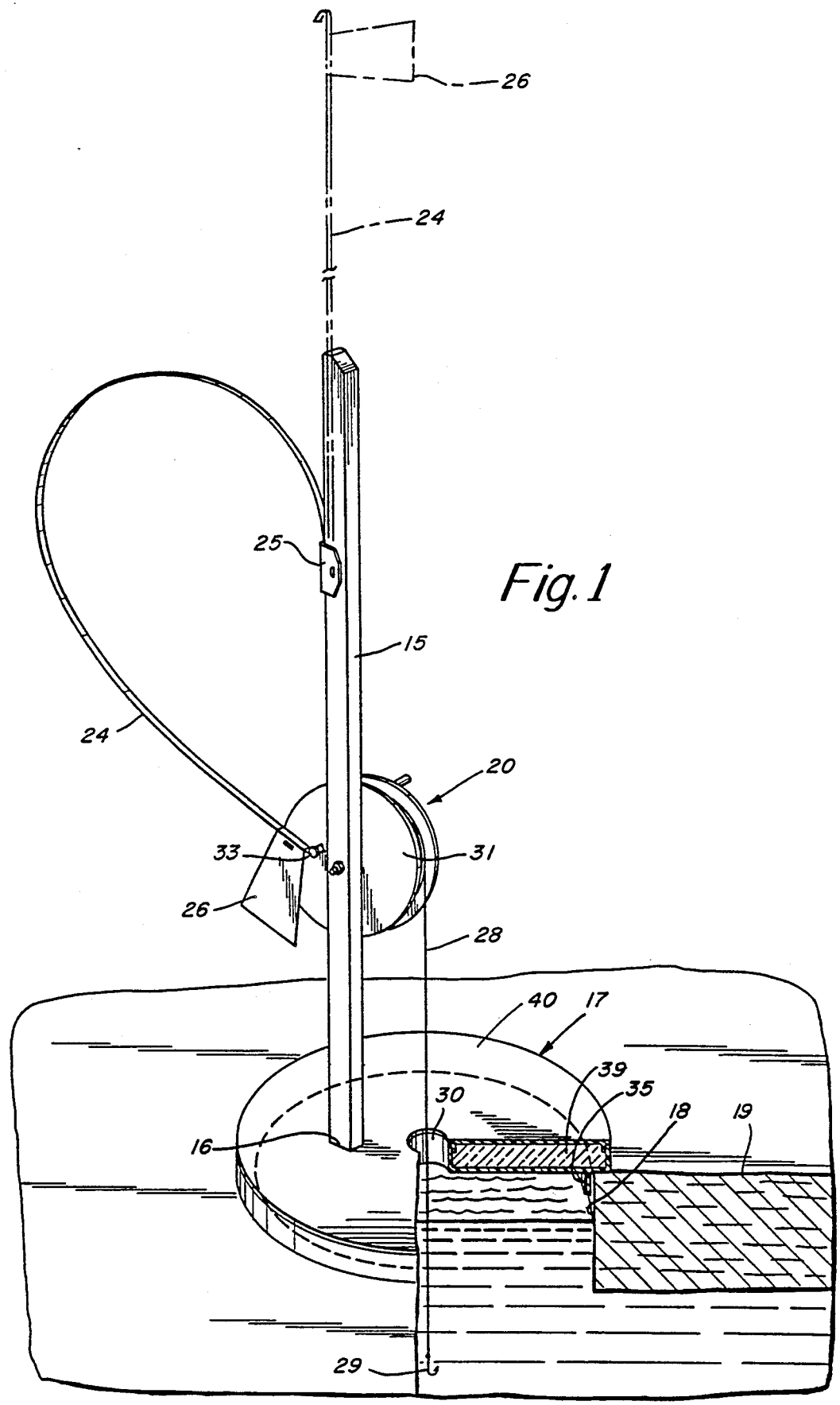
FIG. 1 is a perspective view of a device in accordance with one embodiment of the invention positioned for use over a hole in the ice.
Figure 5:
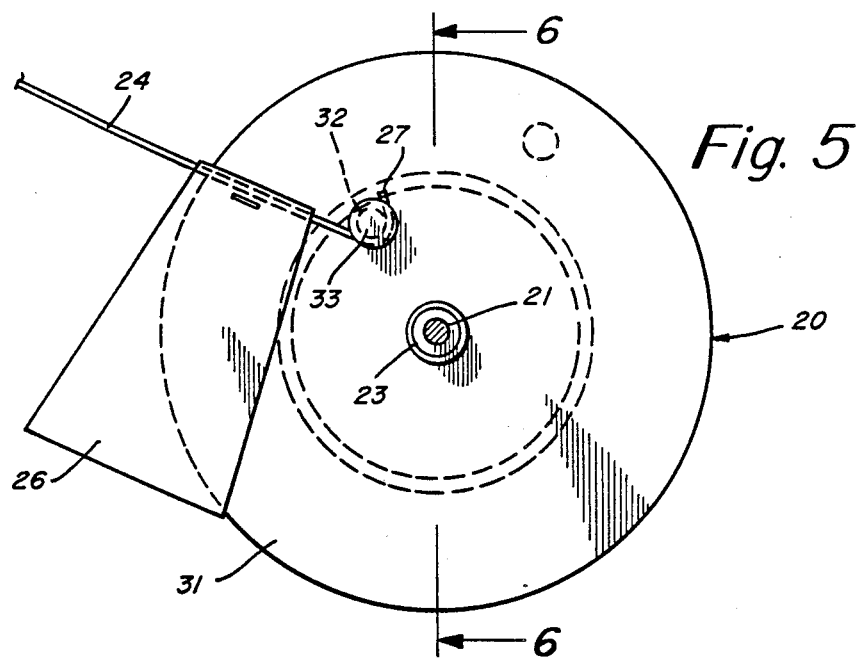
FIG. 5 is a view of the reel, on an increase in scale and taken approximately along the indicated line 5—5 of FIG. 2.
Figure 6:
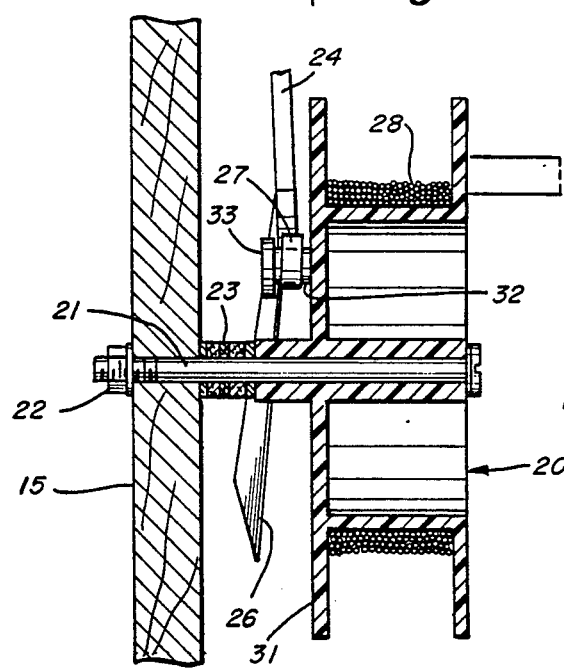
FIG. 6 is a sectional view of the reel taken approximately along the indicated line 6—6 of FIG. 5.

The ice fishing device illustrated by FIGS. 1-7 has a post 15 removably seated in a socket 16 in the upper surface of a support, generally indicated at 17 and shown as a type covering a hole 18 through the ice 19.

A reel, generally indicated at 20 is rotatably mounted on a bolt 21 which serves as an axle and extends through a middle portion of the post 15 and is secured by a nut 22. Between the post 15 and the reel 20, the bolt 21 is provided with a series of fiber washers 23 which both space the reel a wanted distance from the post and serve as an adjustable drag.

A normally straight, narrow length 24 of spring steel has one end attached to a holder 25 slidably secured to the post 15 in a conventional manner. A signal flag 26 is fastened to the other end of the spring steel length which terminates in an arcuate catch 27.

The reel 20 has a line 28 wound thereon to the free end of which a fish hook 29 is attached. The support 17 is shown as an insulated hole cover with its construction later detailed, see FIG. 7 and has a central hole 30 dimensioned to enable the line and fish hook freely to pass there through. The socket 16 is so located that the line from the reel does not engage the sides of the hole 30 in the support 17 when fishing at normal depths. That one of its side walls 31, on the post side of the reel 20 has a cylindrical latch 32 dimensioned to avoid contact with the post 15 as the reel 20 turns and is provided with a flange 33 at its free end.

The latch 32, when the device is set for use with the fish hook 29 at a wanted depth is caught by so bending the spring steel length 24 that its catch 27 can engage and hold the latch 32 and the end wall 33 of which holds the catch against the action of the biased spring steel length (see FIG. 4). The reel 20 is thus held from turning until there is a definite, sustained pull on the line in an unwinding direction with the latch 32 freed on a partial turning of the reel, typically, in the disclosed embodiments slightly in excess of 90°.

Figure 7:
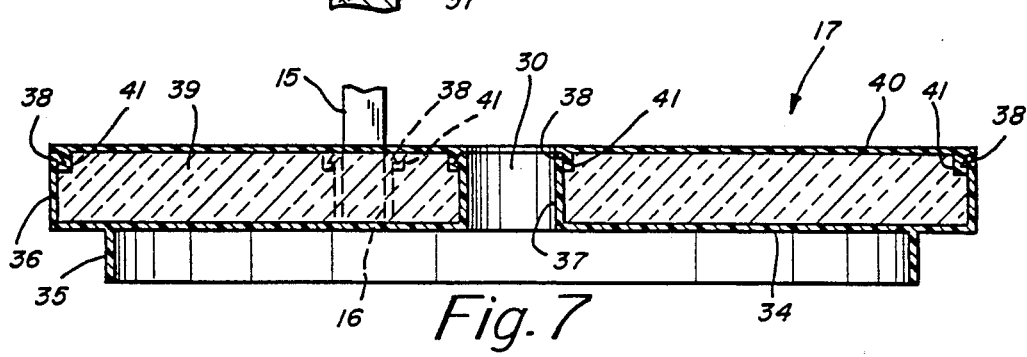
FIG. 7 is a section taken substantially along the indicated line 7—7 of FIG. 3.

The support 17, see FIG. 7, consists of a bottom part 34 having a depending flange 35 on its undersurface spaced inwardly of the side wall 36 and dimensioned to fit freely within the upper part of the hole 18 in the ice to prevent the support from sliding out of position. The bottom part 34 has a central sleeve 37 establishing the hole 30 and also has the socket 16 for the post. The side wall 36, and the walls of the socket and sleeve have inwardly disposed lips 38, and after the bottom part has been filled with insulation 39, the cover 40 is pressed in place with its locking flanges 41 snapped over the lips 37 to securely lock the cover in place against the entrance of water.

Figure 8:
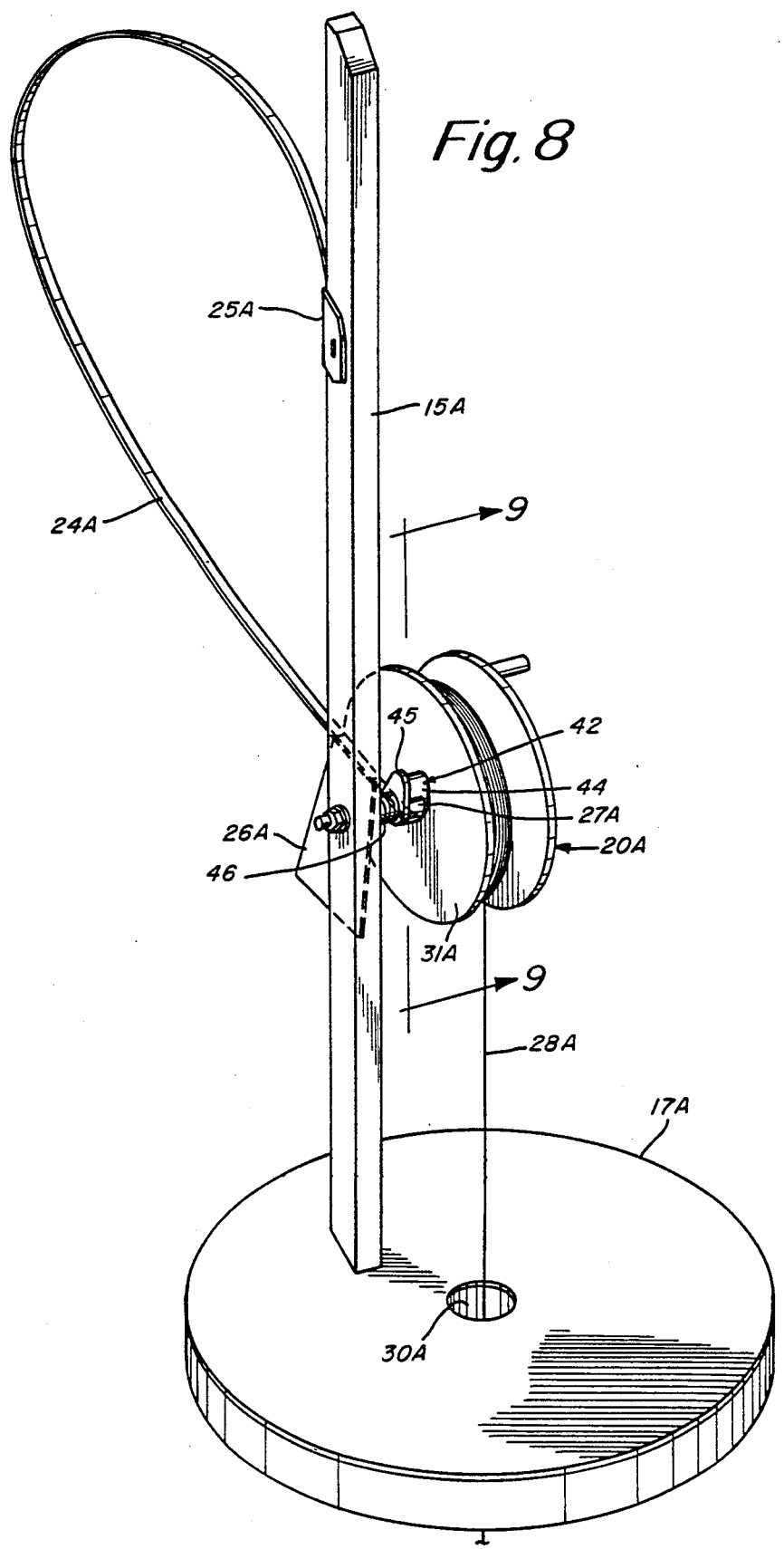
FIG. 8 is a view, similar to FIG. 1, illustrating another embodiment of the invention.
Figure 9:
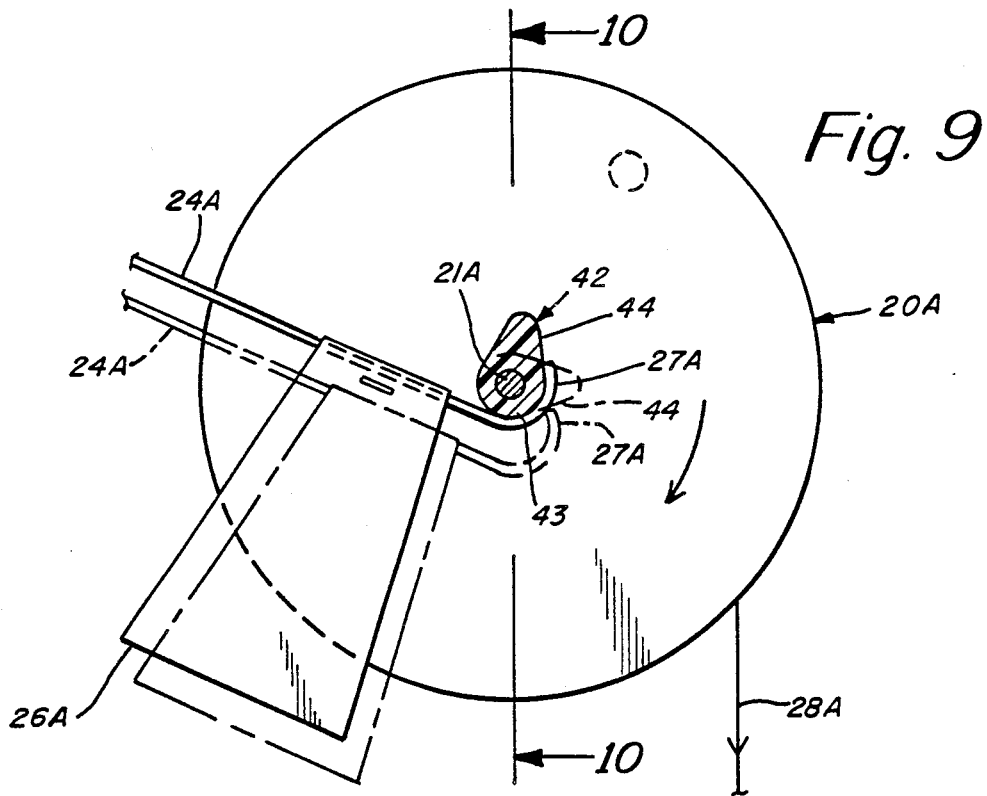
FIG. 9 is a section, on an increase in scale taken approximately along the indicated line 9—9 of FIG. 8.
Figure 10:
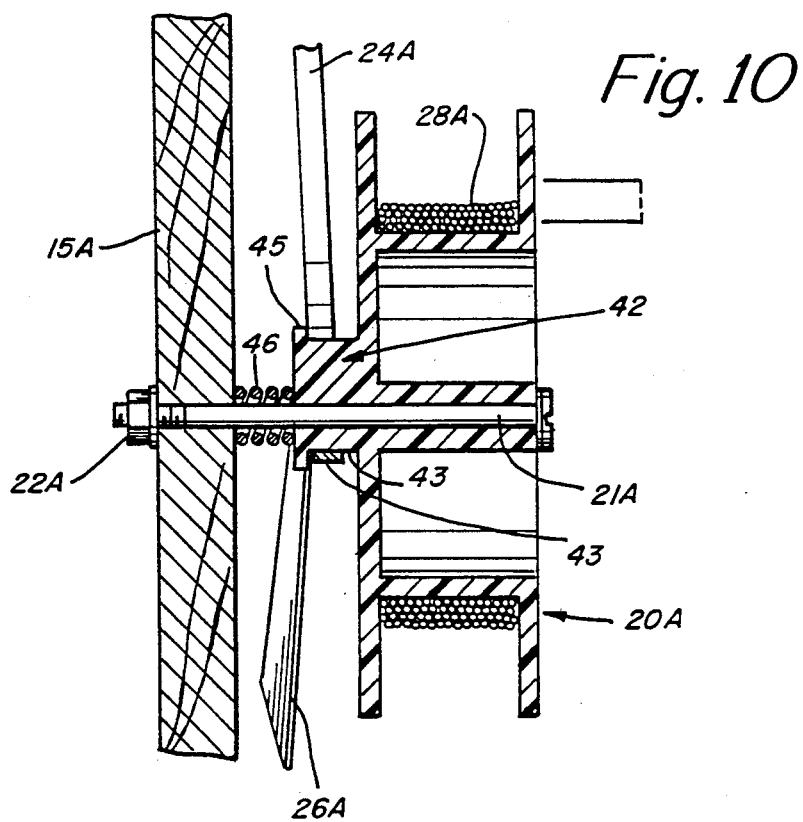
FIG. 10 is a section taken generally along the indicated line 10—10 of FIG. 9.

The embodiment of the invention illustrated by FIGS. 8-10 is generally similar to that of FIGS. 1-7 and will not be described in detail except as to differing features. Corresponding parts, however, are identified by the appropriate reference numerals which are distinguished by the suffix addition "A".

In this embodiment, the arcuate latch is in the form of a cam 42 shown as approximately pear or tear shaped with its wider part or base 43 semi-circular and co-axial with the axis of the reel 20A, and its sides 44 substantially straight. The catch 27A at the free end of the spring steel length 24A is caught about the base 43 of the cam 42 when the device is set. The cam 42 has an end flange 45 to prevent the bias of the spring 24A from disengaging the catch 27A. As will be apparent from FIG. 9, when the reel 20A has been partly turned, approximately 90°, the catch 27A is released. In this embodiment, a spring 46 serves as a spacer between the post 15A and the reel 20A and as an adjustable drag.

While the use of ice fishing devices in accordance with the invention will be apparent from the foregoing, it will be appreciated that the devices are well adapted for use. The supports of a set of devices may be tied together through the central holes. As is conventional, the slides to which the spring steel lengths are connected are slid downwardly to bring the flags against the posts for convenience in carrying them. In use, the devices can be quickly assembled and then with sufficient line pulled from the reel and passed through the holes in the appropriate ones of the supports and the hook baited, each device may be placed in position with its support covering the hole to delay the freezing of water therein for long intervals even in sub zero weather and prevent snow from being blown therein.

Each device is set by bending the spring steel length to an extent enabling the catch thereof to be caught by the latch and so securely held that it cannot be disengaged by strong winds but becomes easily disengaged by the pull of a fish once it has taken the bait in a manner causing the reel to turn through a substantial arc.

I claim:

1. An ice fishing device for use at a hole through the ice, said device including a post having first and second ends, a reel having inner and outer walls between which a line is wound and by which the line is confined, means rotatably connecting the reel to the post between the ends thereof with said inner wall proximate to the post and with a space between them, a length of a straight, narrow spring having first and second ends, means (slidably) connecting the first end to the post with the second end (adjacent the second end thereof, the second end of the spring length) extending away from the first end of the post and including a catch and provided with a flag adjacent the (hook) catch, the inner wall of the reel including a flanged latch extending freely into the space between the post and said inner wall, whereby said latch engageable by the catch to set the device when a wanted length of line is withdrawn from the reel and the spring length is then manually curved in the appropriate direction and to the appropriate extent to enable the catch to entrap the latch, to releasably retain the latch until the reel has been partially turned to release said catch, and a support to which the first end of the post is connected and which is dimensioned to be seated on the ice marginally of the hole.

2. The ice fishing device of claim 1 in which the latch is a cylindrical stud, the arcuate extent of the engagement of the catch with the stud being more than 90° but less than 180°.

3. The ice fishing device of claim 1 in which the latch is a pear shaped cam the larger end of which is arcuate with respect to the axis of rotation of the reel and the arcuate extent of the engagement of the catch with said cam end is more than 60° but less than 180°.

4. The ice fishing device of claim 1 in which the support is a hole cover having upper and under surfaces, a central hole extending through both surfaces, said under surface including depending means spaced inwardly from the edge of the support to fit freely within the hole.

5. The ice fishing device of claim 1 in which the support is shaded and dimensioned to cover the hole in the ice and has a flat upper surface and an under surface provided with retaining means spaced inwardly of the periphery of the support for engagement with the wall of the hole through the ice to prevent the support from sliding out of position, the support has a passageway opening through the surfaces accommodative of the hook and line and a socket opening through the upper surface dimensioned to receive and hold the first end of the post.

6. The ice fishing device of claim 5 in which the support is a light weight container filled with thermal insulation.

7. The ice fishing device of claim 6 in which the support includes a bottom section and a cover therefor, the bottom section is filled with thermal insulation and includes an outer wall, a central circular, hole establishing wall and an offset socket for the post, said cover and the walls and socket having interlocked portions.

8. A support for an ice fishing device having a post, said support in the form of a light weight container filled with thermal insulation and dimensioned to cover a hole through the ice and consisting of a flat surfaced cover and a bottom section provided with depending means spaced inwardly of the periphery of the support for engagement with the ice surrounding the hole to prevent the support from sliding out of position, the container provided with a hole extending through the cover and bottom sections and accommodative of a hook and line and a socket spaced therefrom and dimensioned to receive and hold the post, said bottom section having an outer wall, a central sleeve-establishing a hole and an offset socket for the post, the cover having holes corresponding to the central hole and the offset socket of the bottom section, the walls of the bottom section including said central sleeve and offset socket and the margins of the cover and its corresponding holes including complemental, interlocked portions.

* * * * *